April 30, 1968  W. MUSKULUS  3,380,311
APPARATUS FOR CONVERTING UNIFORM ROTARY MOTION INTO
INTERMITTENT RECIPROCATING MOTION
Filed Oct. 20, 1966  4 Sheets-Sheet 1
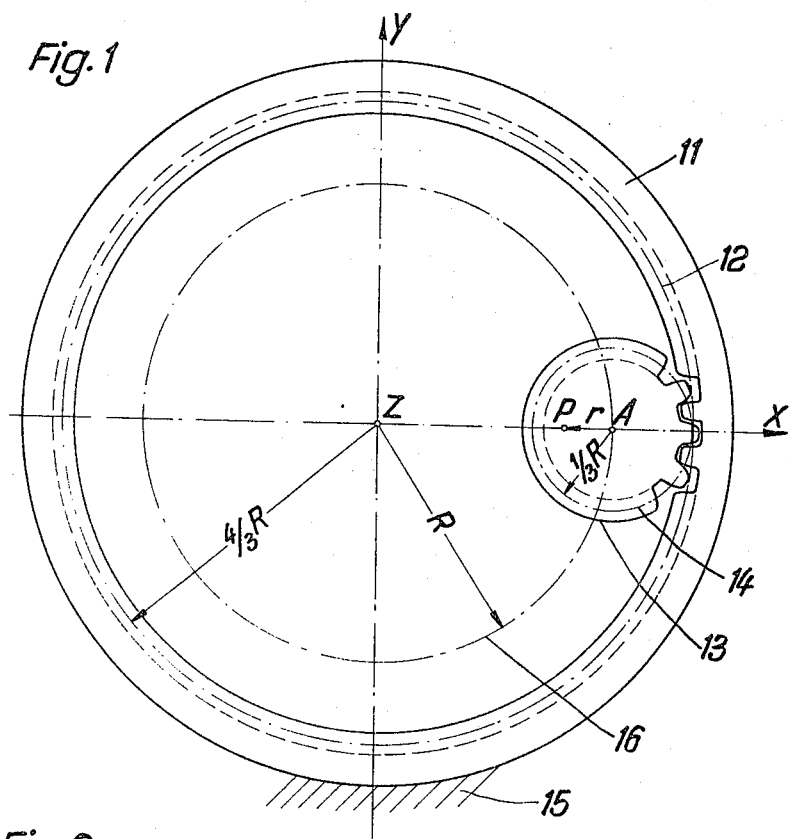
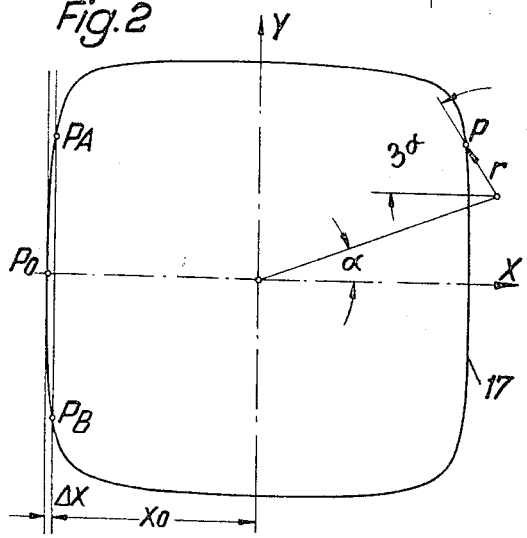
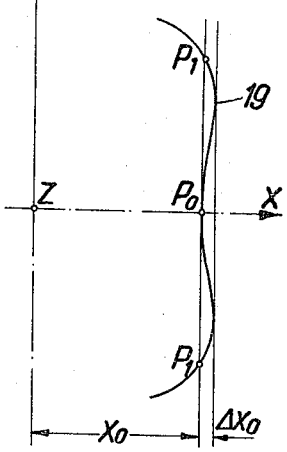
Inventor:
Willi Muskulus

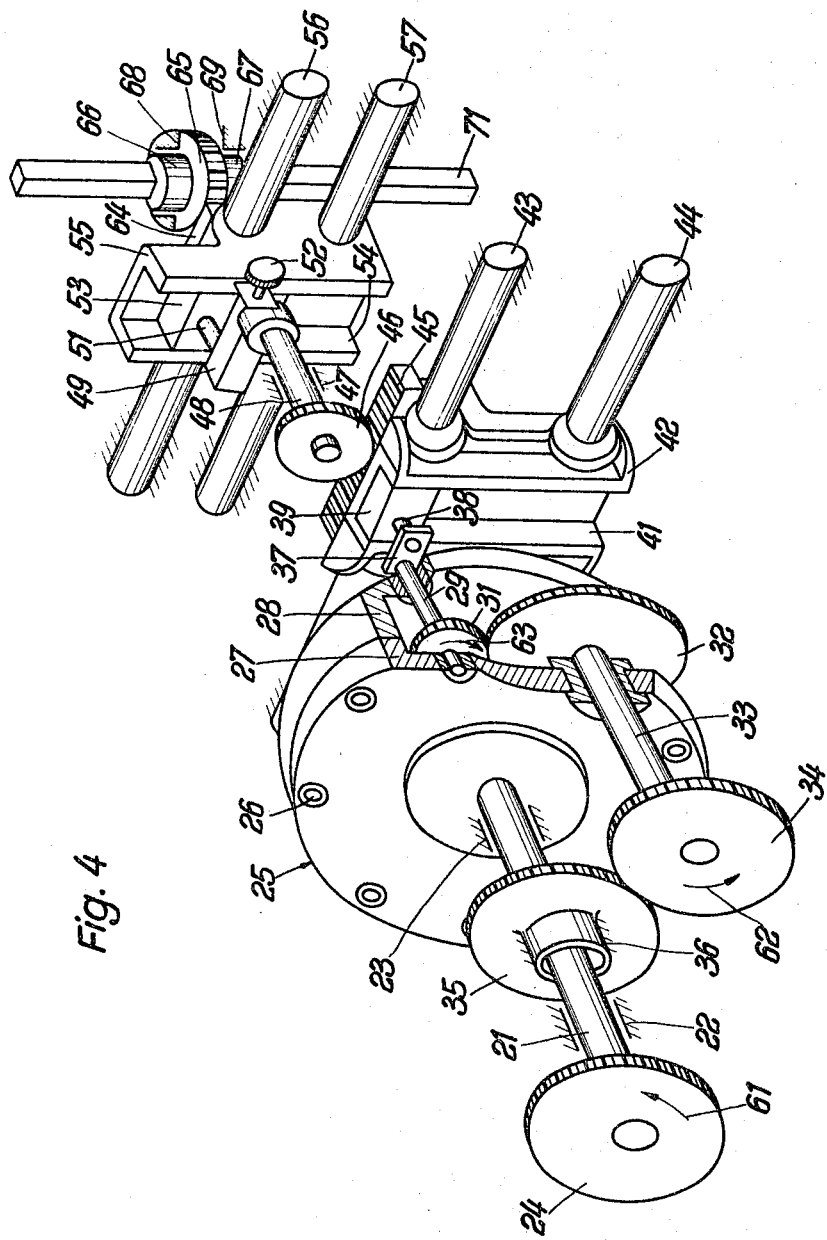

April 30, 1968

W. MUSKULUS 3,380,311

APPARATUS FOR CONVERTING UNIFORM ROTARY MOTION INTO
INTERMITTENT RECIPROCATING MOTION

Filed Oct. 20, 1966

Inventor:
Willi Muskulus
By
Bailey, Stephens &
Huettig

April 30, 1968  W. MUSKULUS  3,380,311
APPARATUS FOR CONVERTING UNIFORM ROTARY MOTION INTO
INTERMITTENT RECIPROCATING MOTION
Filed Oct. 20, 1966  4 Sheets-Sheet 4

Inventor:
Willi Muskulus
By Bailey, Stephens
& Huettig

United States Patent Office 3,380,311
Patented Apr. 30, 1968

3,380,311
APPARATUS FOR CONVERTING UNIFORM ROTARY MOTION INTO INTERMITTENT RECIPROCATING MOTION
Willi Muskulus, Bergen-Enkheim, Germany, assignor to Balzer & Droll, Bergen-Enkheim, Germany
Continuation of application Ser. No. 423,157, Jan. 4, 1965. This application Oct. 20, 1966, Ser. No. 588,218
Claims priority, application Germany, Jan. 11, 1964, B 74,955; July 9, 1964, B 77,602
13 Claims. (Cl. 74—52)

ABSTRACT OF THE DISCLOSURE

A device for converting uniform rotary motion to intermittent reciprocating motion includes a driven planet carrier, a planet wheel of radius X carried by the planet carrier with its axis at a distance 3X from the axis of the planet carrier and a crank of radius 1/3X rigid with the planet wheel; means are provided to cause the planet wheel to rotate about its own axis at the rate four times the rate of rotation of the planet wheel; this achieves a standstill of a member connected to the crankpin four times in each revolution of the planet wheel.

---

This application is a continuation of Application S.N. 423,157 filed on Feb. 4, 1965, now abandoned.

The present invention relates to a method of converting a uniform rotary motion into intermittent reciprocating motion.

The conversion of uniform rotary motion into intermittent reciprocating motion may be necessary for the most different purposes. For instance, in automatic winding machines for the stators and/or armatures or rotors of electrical machines, it is necessary to turn the wrapping needle or the like bearing the wire in the axial end positions of its stroke relative to the part to be wrapped alternately back and forth in agreement with the wrapping step, while when introducing the wire into the groove, such a relative rotation is to be prevented to an extent corresponding to practical requirements.

For this purpose, it is known to produce the required intermittent swinging motion by means of cams. However, rather low limits exist for the maximum obtainable outputs of said drives, since with higher frequencies of swing, the unavoidable vibrations of the device assume excessive values.

It is also known, very generally, to use crank-driven link mechanisms in order to transform a uniform rotary motion into an intermittent reciprocating motion. However, in this connection also the obtainable frequencies of oscillation are limited.

In order to obtain the softest possible entrance and departure of the crank pin in and out of the slots of a Maltese cross, it is known, instead of turning the crank pins around a stationary crank centerpoint, to move the crank centerpoint over a circular path, a planet gear connected for rotation with the crank moving within a rotatable toothed ring with a transmission ratio of 4:1. By suitable selection of the crank radius as compared with the radius of the circular path, it is possible in this connection to give the path of motion of the crank pin the shape of a square with rounded corners, the sides of which are elongated to a greater or lesser extent in the intermediate regions. If the Maltese cross is now so developed and arranged with respect to the path of movement that the crank pin enters into the slot of the Maltese cross in the center of one side of the square, and after a quarter of a revolution of the Maltese cross, emerges from the slot in the center of the adjoining side of the square, then the moving in and out takes place substantially flatter in the direction of the slot than in case of a movement of the crank pin along a circle and a Maltese cross is accelerated and delayed substantially more gently during its rotation.

The object of the present invention is to convert a uniform rotary movement into an intermittent reciprocating movement while avoiding both cam drives and crank-driven link mechanisms in order to make possible high outputs with a simple geometric arrangement. The method which solves this problem makes use of the known principles for the production of square paths of movement for the crank pin in a Maltese-cross drive, and resides in the fact that, by the rotary movement, the center of rotation of an eccentric point is brought into a uniform movement in a circular path, the radius of which is equal or approximately equal to nine times the radius of the eccentric, that the point of the eccentric is given a movement around the center of the eccentric in the path of the circular movement, but with an opposite direction of rotation, the absolute speed of rotation with which the center of the eccentric moves around the centerpoint of the circular path, and that the projection of the absolute movement of the eccentric point on the one axis of the common plane of movement of the center of the eccentric and the point of the eccentric is taken off directly or indirectly as reciprocating motion. In this way, it is possible to obtain over a relatively large range an extensive stoppage of movement to an extent sufficient in many cases for practical requirements.

As an advantageous further development of the method of the invention, the residual movement in the standstill regions can be further quieted, for the indirect taking-off of the reciprocating motion, by first of all transforming the projection of the movement of the point of the eccentric on the said axis into a velocity-proportional and acceleration-proportional rotary swinging motion of a second point of the eccentric around a fixed center through an angle which is equal to or approximates 180°, the projection of which on an axis which passes through the end points of the rotary swinging motion is taken off directly as reciprocating motion.

By this further development, there is created in particular the possibility of varying the length of stroke of the reciprocating motion by merely changing the eccentricity of the second point of the eccentric, which, in the case of the first-mentioned point of the eccentric, is not possible in practice without a simultaneous change in the radius of the circular path.

One particularly suitable device for the carrying out of the method comprises, in accordance with a special feature of the invention, a planetary gearing with a planet wheel which can be driven by rolling on a centrally arranged non-rotatable gear by means of the planet wheel carrier which is driven in uniform rotary motion, and a crank which is connected for rotation with the planet gear and has an eccentric crank pin which engages in a slide block which is freely movable in a linear guide being borne by a slide which is movable at right angles to it and transversely to the axis of the gearing, from which slide the reciprocating motion can be directly obtained.

For a compact, uncluttered construction of the device in accordance with the invention, it is advantageous for the centrally arranged, non-rotatable gear to be a sun gear in which there engages an intermediate gear which is borne by the planet gear carrier and by which the planet gear can be driven by gear engagement.

In order further to quiet down the intermittent reciprocating motion and in the end positions in the device of the invention, the deriving of motion from the movable slide member is effected indirectly by a rack connected with the slide member and a drive pinion which engages said rack to which is connected a second crank having an eccentric crank pin which engages in a slide block freely displaceable in a linear guide directed transverse to the crankshaft, the last mentioned guide being borne by a second slide member which is movable at right angles to it and in a direction transverse to the crankshaft, from which second slide member the reciprocating motion can be derived. In this connection, the radius of the second crank is preferably adjustable within a predetermined range so that, when the angle of oscillation of this crank is retained, the stroke of the reciprocating motion can be varied as desired.

Such a possibility of adjustment is sufficient in many cases. When the device is used, for instance, to drive the winding needle of an automatic winding device for the stators of electrical machines in which only one constant winding step is required, this possibility of adjustment is entirely sufficient for the setting up of the winding device. If on the other hand the stators are to be wound, as in three-phase current machines, with a plurality of coils of different winding steps, then the crank radius of the second crank drive must be changed for each new winding step. In order to avoid this, a device for the carrying out of the method of the invention with indirect tapping of the reciprocating motion from the slide which is movable in a direction transverse to the axis of the gearing comprises in accordance with a special feature of the invention, a reciprocatable member for the direct derivation of the reciprocating motion which can be driven from the slide through a double-armed swinging lever, the lever-arm ratio of which is variable. It is advisable in this connection to construct the reciprocatable member as a toothed segment which is swingable about a stationary axis and which engages with a pinion which can thereby be placed in rotary oscillation.

The invention will be described in further detail below with reference to the drawing, in which:

FIG. 1 is a perspective drawing of the principle of a planet gearing with an internally toothed ring wheel and a planet wheel rotating therein.

FIG. 2 is a diagram which serves to explain the geometric relationship in the production of a square-like path of motion by means of a planetary gearing in accordance with FIG. 1.

FIG. 3 is a diagram partially showing a path of motion different from FIG. 2.

FIG. 4 is a gearing in accordance with the invention for use in a device for winding the stators of small electric motors.

Figure 5:
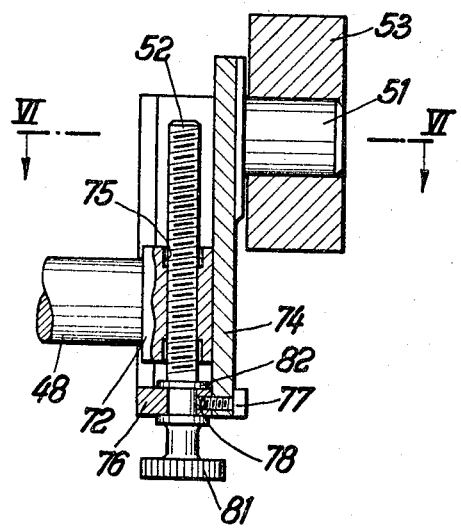
FIG. 5 is an adjstable crank of the gearing of FIG. 4, shown in partially sectional view.

In FIG. 1 there is shown an internally toothed ring wheel 11 having a pitch circle 12 into which a planet wheel 13 having a pitch circle 14 engages. The ring wheel, as indicated at 15, is turnable and the planet wheel 13 is supported on a planet-wheel carrier (not shown in detail) upon the rotation of which about the center of the system the planet wheel 13 moves with its axis indicated at A on a circular path 16 of radius R and at the same time rolls in the ring wheel 11 in a direction opposite to the direction of rotation of the planet-wheel carrier. The radius of the planet wheel pitch circle 14 has a length of one-third the radius R of the circular path 16, resulting in a radius for the pitch circle 12 of the ring wheel 11 of $$\frac{4}{3} \cdot R$$

The transmission ratio between the ring wheel 11 and planet wheel 13 is thus 1:4, that is, in the event that the ring wheel were rotatable, the planet wheel would, during one revolution of the ring wheel with the planet-wheel carrier held fast, turn four times around its axis indicated by the point A. Since, however, as indicated above, the ring wheel is fixed and the planet-wheel carrier can rotate instead (the rotation of the planet wheel around the axis A being opposite the direction of rotation of the planet-wheel carrier, indicated by the radius R, around the center Z) the planet wheel 13, upon one revolution of the axis A around the center Z, carries out, in absolute value, only three revolutions. In other words, the angle of absolute rotation of the planet wheel in a given period of time is three times the angle of rotation which the planet-wheel carrier moves through during the same unit of time.

In order further to explain these relationships, there is shown in FIG. 1 a coordinate system with a horizontal axis $x$ and a vertical axis $y$. Let us assume that at the time $t=0$, the planet-wheel carrier has, as shown, such a position that the radius connecting the points Z and A coincides with the positive direction of the $x$-axis.

Furthermore, let us consider first an arbitrary eccentric point P on the planet-wheel 13 which, at the time $t=0$, is also located on the $x$-axis with a radial spacing $r$ of the radius of the eccentric from the axis A in the direction toward the center Z. If the planet-wheel carrier is now turned in a counterclockwise direction through an angle $\alpha$ between the $x$-axis and the planet-carrier radius R, then, as shown in FIG. 2, the eccentric radius $r$, due to the above conditions, describes an absolute angle of the value $3\alpha$ with respect to the direction of the $x$-axis, while the angle enclosed between the planet-carrier radius R and the eccentric radius $r$ is equal to $3\alpha+\alpha=4\alpha$. Accordingly, we can set up the following equations for the path of motion of the eccentric point P in the coordinate system shown:

$$x = R \cos \alpha - r \cos 3\alpha \quad (1)$$

$$y = R \sin \alpha + r \sin 3\alpha \quad (2)$$

As is known in principle, with suitable dimensioning of the ratio between the planet-carrier radius R and the eccentric radius $r$, there can be obtained a path of motion 17 of the point P which has essentially the shape of a square with rounded corners. It is clear that, with a relatively small eccentric radius $r$, the shape of the path of motion will approach closer to a circle of radius R in which connection the square sides established are curved only slightly less than the circular path produced by the radius R. With a relatively large eccentric radius, on the other hand, there is obtained a path of motion in which the square sides in the central region are bent inward toward the center of the system Z.

The right-hand part of such a path of motion 18 is shown in FIG. 3. As can be noted therefrom, spaced on both sides from the centerpoint $P_0$ of the side of the square which is here shown, there are located on the path of motion the points $P_1$ and $P_2$ which are at the same transverse distance $x_0$ from the axis of symmetry $y$ parallel to said square side as the centerpoint $P_0$ of the side. If the angle of rotation of the planet carrier corresponding to the points $P_1$ is represented by $\alpha_1$ and $-\alpha_1$ respectively, then by equating the X-values in accordance with Equation 1 for the points $P_1$ and $P_0$, we can set up the relationship $$R \cos \alpha_1 - r \cos 3\alpha_1 = R - r \quad (3)$$

or $$R = r \cdot \frac{1 - \cos 3\alpha_1}{1 - \cos \alpha_1} \quad (4)$$

As has been mentioned above, such desirable points $P_1$ are only present when the square sides of the path of motion are curved inward in the central region. The smaller this curvature, the closer these points will be to the center point of the square side under consideration. It follows from this that an optimum stretching of the square sides will obviously be obtained when these points, as a result of increasing reduction in the eccentric radius $r$, come so close to the common side center point $P_0$ that they coincide with it. Since in this case the angle $\alpha_1$ which is determinative for the position of the point $P_1$ tends, in accordance with the above equation, to a value of zero, it is possible to carry out a limit-value analysis $\lim x$ for $\alpha_1$ toward zero which leads, by expansion of numerator and denominator of Equation 4 by $1+\cos \alpha_1$ and using the known relationships $$\cos 3x = 4 \cos 3x - 3 \cos x \text{ and } \sin{}^2 x + \cos{}^2 x = 1$$

leads to the result $$\lim_{\alpha \to 0} R = 9r \qquad (5)$$

This means that, for an optimum stretching of the square sides, the planet carrier radius must be equal to 9 times the eccentric radius.

The invention utilizes these basic discoveries by deriving from such a path of motion only the projection on one of the two axes, for instance the $x$-axis, in accordance with Equation 1 with $R$ equal or approximately equal to $9r$. In this case, to be sure, while the eccentric point passes over the right hand or left-hand side of the square of the path of motion, no absolute stoppage of the derived movement is obtained. For a relatively large part of such a square side, which is limited in FIG. 2 for instance by the points $P_A$ and $P_B$ located symmetrically to the $x$-axis, the deviation $\Delta x$ from the value $x_0$ at the point of intersection of the path of motion with the $x$-axis is very small, so that, over a large angle of rotation of the planet-wheel carrier and thus over a large period of time during a half revolution of the planet wheel carrier, there can be obtained a standstill which is sufficient for practical requirements in many applications. It is self-evident that this standstill is repeated during the second half revolution of the planet-wheel carrier while, in the intervening periods of time, the desired reciprocation takes place.

It is advantageous to make the ratio between the planet-carrier radius $R$ and the eccentric radius $r$ somewhat less than 9:1 and to tolerate the slight curvature inward of the central parts of the square sides which is caused thereby, as shown by the statements made above, and which is shown in FIG. 3. If this curvature is selected just great enough, with respect to the showing of FIG. 3, so that the transverse distance $\Delta x_0$ of a double tangent 19 drawn from the outside to the path of motion from the point $P_0$ on the $x$-axis does not exceed the deviation permissible for the practical requirements of the derived motion from absolute standstill, then, by this measure, the time of standstill which can be utilized in practice can be optimally increased to a range between the upper and the lower points $P_1$.

In FIG. 4, there is shown a gearing for the reduction to practice of the inventive concept, which can be used for instance in a winding device for the stators of small electric motors. This gearing has a drive shaft 21 which is supported in fixed position at 22 and 23, for instance in a machine frame, not shown in the drawing. A spur gear 24 serves to drive the shaft 21 through a drive device (not shown), such as an electric motor. At its other end, the shaft 21 bears, overhung, a planet wheel carrier 25, constructed as a housing which consists of two parts 27 and 28 connected to each other by screws 26.

In the planet wheel carrier 25, there is rotatably supported a planet wheel shaft 29 with a planet gear wheel 31. The planet gear wheel meshes with a second planet gear wheel 32 which is seated on an intermediate shaft 33 supported also in the planet wheel carrier 25 and the second planet gear is in driving connection through shaft 33 with a gear wheel 34 arranged outside the planet wheel carrier. The gear wheel 34 meshes with a sun wheel 35 which is arranged coaxially to the drive shaft 21 and is held against rotation, as indicated at 36, without being connected with the drive-shaft 21.

The shaft 29 extends at the rear end of the planet-wheel carrier out of the latter and bears on its protruding end a crank 37 with an axially directed crank-pin 38 which engages in a corresponding bore in a slide block 39.

The slide block 39 is supported for vertical displacement in a guide channel 41 in a slide member 42. The slide member 42 is provided with two bores which pass through horizontally, spaced from the guide, for the slide block 39, through which bores two slide bars 43 and 44 which are fixed in position at their ends extend. The slide member 42 is thus displaceable horizontally on the slide bars 43 and 44, transverse to the axial direction of the shaft 21.

The slide 42 bears on its top a horizontally arranged rack 45, in the upwardly directed teeth of which a pinion 46 engages. The pinion 46 is seated on a shaft 48 supported in fixed position at 47 and bearing at its other end a crank 49 having an axially directed crank pin 51. The eccentricity of the crank pin 51 is adjustable—as will be explained further below—by means of a set screw 52.

The crank pin 51 engages in a corresponding bore in a slide block 53 which is displaceable vertically in a slide guide channel 54 of a slide member 55. The slide member 55 is provided, in a similar manner to the slide 42, with two horizontal boreholes through which slide bars 56, 57 fixed in position at their ends extend, on which bars the slide member 55 is displaceable horizontally transversely to the axial direction of the shaft 48.

The manner of operation of the gearing described is as follows: Let us assume that the shaft 21 is driven in a counterclockwise direction, as indicated by the arrow 61, by the drive device (not shown) through the gear wheel 24. Since the planet-wheel carrier 25 is connected for rotation with the shaft 21, the latter is also turned in the direction of the arrow 61 and the eccentrically arranged shafts 29 and 33 are swung around the shaft 21, the gear wheel 34 rolling in the direction indicated by the arrow 62 on the stationary sun wheel 35. The rolling motion of the gear-wheel 34 is translated through the shaft 33 to the planet wheel 32 and the planet wheel 31 meshing with it, as well as the crank 37 connected with it by the shaft 29, are turned in a direction opposite to the direction of the arrow 61, as indicated by the arrow 63.

Thus, even when using a sun wheel instead of an internally toothed ring wheel as shown in FIG. 1, there is obtained a rotation of the planet wheel 31 opposite to the direction of rotation of the planet-wheel carrier, it being merely important for the transmission ratios between the gear wheels 31, 32 and 34, 35 that the overall transmission ratio between the planet wheel 31 connected with the crank 37 and the sun wheel 35 has a value of 4:1.

The crank 37 is so arranged on the shaft 29 that it points radially inward toward the shaft 21 when the shaft 29, upon rotation of the planet wheel carrier 25, is at the same height as the shaft 21. Because of the predetermined transmission ratio between the planet gear 31 and the sun wheel 35 of 4:1, the crank 37 when also extends radially inward in the positions of the planet-wheel carrier 25 which are 90° and 180° away, and the crank pin 38, depending upon its eccentricity in relation to the distance from the shaft 29 to the shaft 21, carries out a square-like movement in the direction of the arrow 61 around the shaft 21.

The horizontal component of this motion ($x$-value in the coordinate system of FIGS. 1 to 3) is transmitted through the slide block 39 to the slide member 42, while the vertical component ($y$-value) causes an idle motion of the slide block 39 within the guide 41.

In many cases, it will be sufficient to take off the desired intermittent reciprocating motion directly from the slide 42. In the case of the gearing shown in FIG. 4, however, an arrangement is provided for the further smoothing of the reciprocation in the standstill region. By the rack 45, the reciprocating motion of the slide 42 is converted into an oscillating motion of the crank 49 through the pinion 46 and the shaft 48 which is supported in fixed position. The pinion 46 is so dimensioned that the angle of the oscillating motion is at least approximately 180°. Furthermore, the crank 49 is so arranged that it is directed substantially horizontally in the end positions of the oscillating motion.

The horizontal component of the oscillating motion carried out by the crank 49 is converted, in a manner similar to what occurs in the case of the slide member 42, into a horizontal motion of the slide member 55, while the vertical component again causes idling of the sliding block 53 in the slide guide 54.

The intermittent oscillatory motion is derived from the slide member 55, as will be explained in further detail below.

The further smoothing of the intermittent reciprocating motion in the standstill regions which can be obtained by this measure is based on the utilization of the dead center positions of the crank 53 in the end positions of the oscillatory motion, as a result of which even stronger deviations of the slide member 42 from its end positions during the circulatory movement of the crank pin 38 do not cause any deviations of the slide member 55 from these end positions beyond the amount permissible in each case.

As already mentioned above, the mechanism shown in FIG. 4 is intended for a device for the winding of stators of small electric motors, the swinging motion of the guide means which introduce the wire into the stator grooves with respect to the stator for the obtaining of the required winding step being used by the mechanism. For this purpose, the slide member 55 on the side thereof facing away from the slide guide 54 has a horizontally extending rack 64 which engages with a pinion 65. The pinion 65 is provided on the top and bottom with cylindrical projections 66 and 67 respectively by which it is supported both radially and axially at 68 and 69. The pinion is provided in the axial direction with an opening of square cross-section through which a square rod 71, which is connected in rotation with the pinion but is axially displaceable, extends. The square rod 71 serves as a support for the wire guide means (not shown in the drawing) and is moved up and down by a drive (also not shown in the drawing), for instance a cam plate drive, at the same rate as the turning of the pinion 65 but shifted in phase with respect thereto. Since such motion devices are known in principle, it is unnecessary to describe and show their details. It is self-evident that, in order to produce the upward and downward motion, a second gearing, similar to that shown, can be used.

The connecting of the second crank drive with the crank 49 behind the slide member 42 has the additional advantage that the crank 49, in order to make possible a differential stroke of the intermeittent reciprocating motion derived, from the slide member 55, can be made adjustable without changing the shape of the path of the motion by the displacement. In this way, in the case of a winding device for electrical machines, the winding step can be adjusted or set precisely.

Figure 6:
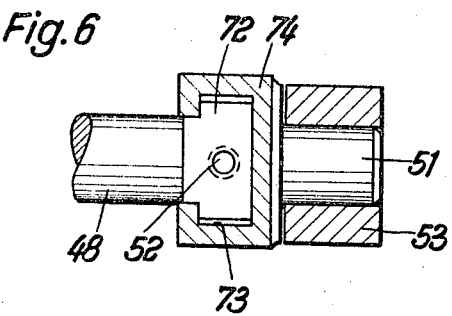
FIG. 6 is a cross-section along the line VI—VI of FIG. 5.

FIGS. 5 and 6 show such an adjustable crank. The shaft 48, at its crank-side end, has a square head 72 which is radially displaceable in a profiled groove 73 of a crank arm housing 74 which bears the crank pin 51. The square head is provided with a bore 75, the central region of which is constricted to form a threaded bore.

In the end of the profiled groove 73 away from the crank pin 51, a cover 76 is inserted and held against displacement in the profiled groove by means of a fillister-head screw. The cover 76 is provided with a bore 78 through which a set screw 52 having a knurled head 81 is passed. The thread of the set screw 52 engages in the thread of the bore 75. The knurled head 81 lies with its shank-side end against the outside of the cover 76 and is held in position by a spring 82 which is set in a groove of the set screw 52 and rests against the inside of the cover 76. By turning the knurled head 81, the crank arm housing 74 is displaced radially with respect to the square head 72 of the shaft 48 and thereby the eccentricity of the crank 51 with respect to the shaft 48 is adjusted to the extent desired.

Figure 7:
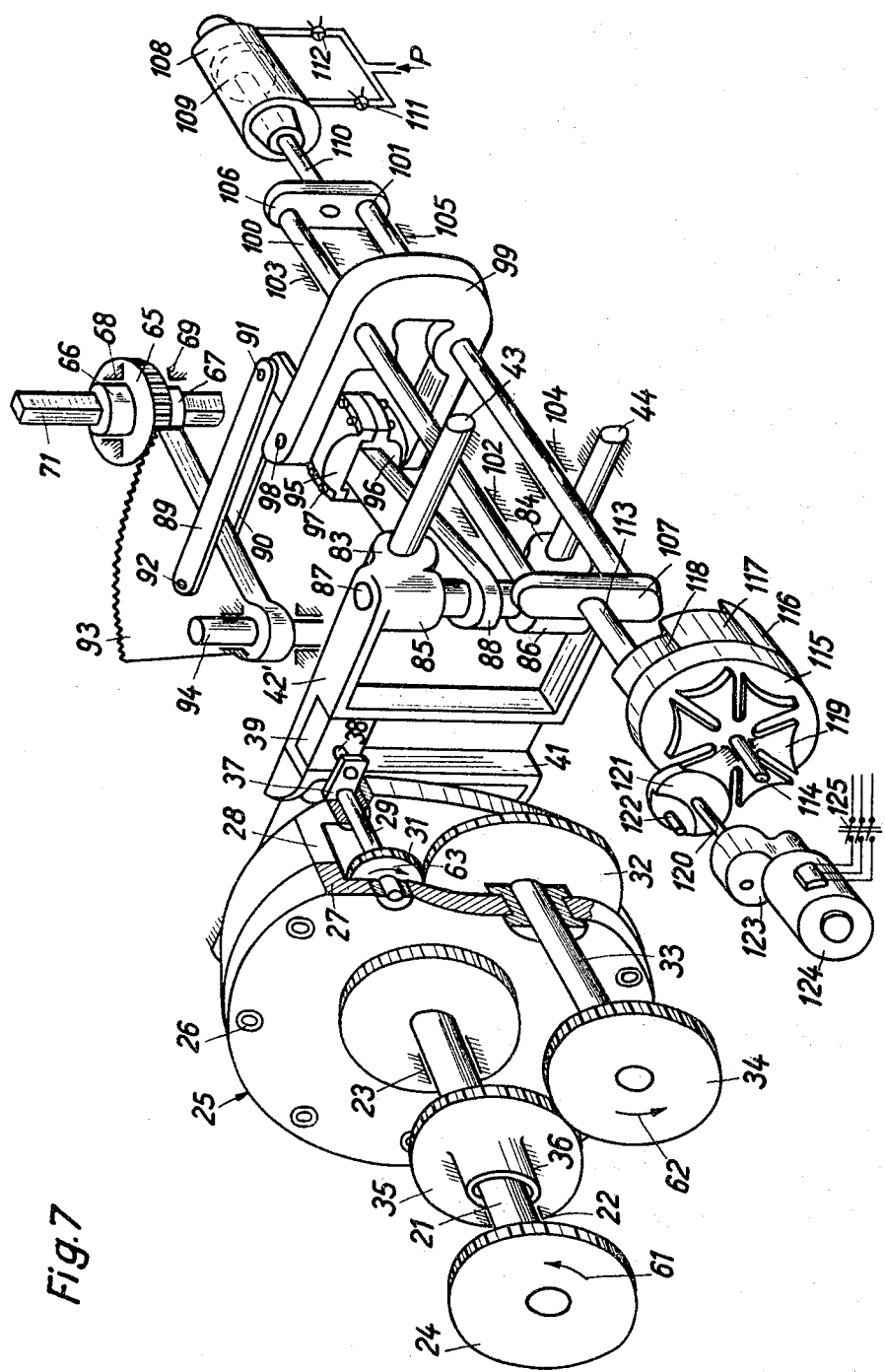
FIG. 7 is a perspective showing of a modified embodiment of the gearing in accordance with the invention, in a form suitable in particular for use in a winding device for the stators of small electrical motors for alternating or three-phase current.

The embodiment of the device in accordance with the invention which is shown in FIG. 7 contains the same planet wheel gearing as the gearing of FIG. 1. The same parts have been provided with the same reference numbers and the repetition of a description of these parts can be dispensed with.

In the gearing in accordance with FIG. 7, a slide member 42' is provided, on the one longitudinal end of which there are formed two lugs 85 and 86 which are vertically spaced from each other. In the aligned bores of these lugs 85, 86, there is inserted a pin 87 by means of which the bored end of a strap 88 on the side 42 is pivoted between the lugs 85 and 86.

At the other end of the strap 88, there are pivoted by a pivot pin 91 two parallel links 89 and 90 which are pivotally connected by a pivot pin 92 with a toothed segment 93 which is swingable horizontally around a stationary pivot pin 84.

The toothed segment 93 meshes with a pinion 65 which is provided at top and bottom with cylindrical extensions 66 and 67 respectively. By means of the extensions 66 and 67, the pinion is supported both radially and axially at 68 and 69 respectively. The pinion is provided in its axial direction with an opening of square cross-section through which a square rod 71 extends which is axially displaceable but held against rotation.

The square rod 71 serves for instance as support for the winding needle (not shown) of an automatic wrapping device for the stators of electrical machines. It is moved back and forth by a drive (not shown), for instance by a cam drive, in synchronism with the rotation of the pinion 65, but displaced in phase with respect to same. Since such motion drives are known in principle, it is unnecessary to show and describe the details thereof. It is self-evident that a second gearing similar to the gearing shown can be used also to produce the upward and downward motion.

The strap 88 is guided displaceably in a swivel bearing within the region between the pivot pins. This bearing consists of two cup-shaded bearing bodies 95, 96 which receive the strap 88 in a longitudinally displaceable manner between them and which are made preferably of bronze, gunmetal or the like and are screwed together by screws 97. In the embodiment shown, the bearing brasses are developed as bodies of revolution which are milled flat on two opposite sides, the upper engaging through a centering collar over a centering extension on the lower body of revolution and the lower body of revolution being provided with a recess extending transversely to the flattened side surfaces to receive the strap 88.

The swivel bearing 95, 96 is mounted by means of pivot pins (only the upper pin 98 of which is visible in the drawing), for rotation about a vertical axis between the ends of the horizontally extending arms of a bearing member 99 which is carried by two guide rods 100 and 101 and firmly connected with them. The guide rods 100, 101, as indicated at 102 and 103, 104 and 105, are supported in a longitudinally displaceable fashion on the machine frame (not shown). The ends of the guide rods 160, 101 are connected with each other by yokes 106 and 107 respectively.

In front of the yoke 106, there is arranged a double-acting power cylinder 108 having a working piston 109 which is operatively connected through a piston rod 110 with a yoke 106. To the working chambers formed in front of and behind the piston 109 in the cylinder 108, a pneumatic or hydraulic pressure medium can be fed through valves 111 and 112 respectively from a source of pressure medium, not shown in the drawing, or the working chambers can be vented through the valves 111 and 112.

In front of the yoke 107, there is an adjustable stop device which is formed by a stop bolt 113 which comes against the yoke 107 of a stepped drum and of an adjusting device for the latter.

The stepped drum consists of a disk 115 which is supported in fixed position, at 114, against the end surface of which disk facing the yoke 106 there are fastened, distributed over its periphery, exchangeable stop members of different height, three of which can be seen at 116, 117 and 118 in the drawing. The exchangeable members can, as shown, be developed in a segmental shape or may have any other desired shape. There are preferably provided on the disk 115 a number of exchangeable members equal to the number of desired different lengths of stroke for the intermittent reciprocating motion.

The adjusting device consists of a Maltese cross 119, which is arranged coaxial to the stepped drum and connected for rotation with it, the indexing of which cross corresponds to the number of steps on the stepped drum, and of a crescent-shaped locking disk 121 having a driving pin 122 and arranged on an adjusting shaft 120. The development and manner of operation of such a self-locking Maltese-cross drive is generally known, and therefore requires no special explanation. The adjusting shaft 120 is operatively connected through a gearing 123 with an electric motor 124 which, by means of a switch 125, can be connected to a source of voltage (not shown), for instance a three-phase current network, and is driven in a given direction of rotation upon the connecting of the switch 125.

The manner of operation of the gearing described is as follows: Let us assume that the shaft 21 is driven in counterclockwise direction by the drive device (not shown) through the gear 24, as indicated by the arrow 61. Since the planet-wheel carrier 25 is connected for rotation with the shaft 21, the latter is also turned in the direction of the arrow 61 and the eccentrically arranged shafts 29 and 33 are swung around the shaft 21, in which motion the gear 34 rolls in the direction indicated by the arrow 62 on the stationary sun wheel 35. The rolling motion of the gear 34 is transmitted by the shaft 33 to the planet wheel 32, and the planet wheel 31 meshing with the latter, as well as the crank 37 connected with the same by the shaft 29, are turned in a direction opposite the direction indicated by the arrow 61, as indicated by the arrow 63.

As already mentioned, in this movement crank pin 38 carries out a movement similar to a square in the direction of the arrow 61 around the shaft 21. Of this motion, the horizontal component (x-value) is transmitted by the slide block 39 to the slide member 42′ while the vertical component (y-value) causes an idling movement of the slide block 39 within the guide 41.

The slide member 42′ in its reciprocating motion carries along with it the front end of the strap 88 and swings the latter together with the swivel bearing 95, 96 around the axis of the bearing pin in the bearing bracket 99. In this connection, the strap 88 acts as a double-armed swing lever, the other arm of which transmits through the links 89 and 90 a corresponding oppositely-directed reciprocating motion with an intermediate standstill to the toothed segment 93 and swings the latter back and forth whereby the pinion 65 and the square rod are also intermittently turned back and forth.

It is clear that the angle of swing of the toothed segment 93 depends on the lever-arm ratio of the double-armed swivel lever formed with the strap 88 with respect to the axis of swing thereof. This lever arm ratio is variable in two manners in the embodiment shown by way of example.

Let us first of all assume that the valves 111 and 112 are in such a position that the front working chamber in the cylinder 108 is vented and the rear working chamber is under pressure so that the stop bolt 113 on the piston 109 is pressed, through the piston rod 110, the yoke 106, the guide rods 100, 101 and the yoke 107, against a stop on the stepped drum 115–118 and thus the bearing bracket is held fast in a given position with respect to the machine frame. Under these circumstances, the front end of the strap 88, if it were not pivoted to the slide member 42′, would describe a circular arc in a horizontal plane during the swinging back and forth of the swivel bearing 95, 96. Since the slide member 42′, however, carries out a linear motion, the front end of the strap 88 must follow this linear motion and is forced during its swinging motion simultaneously to slide back and forth in the swivel bearing 95, 96. This has the result that the lever-arm ratio of the double-armed swivel lever formed by the strap 88 is continuously changed. In this connection, the front lever arm pivoted to the slide member 42′ reaches its maximum value in the central position of the oscillation directed at right angles to the movement of the slide and its minimum value in the two end positions, while the conditions are reversed in the case of the other lever arm which is connected through the links 89, 90, with the toothed segment 93. In this way, the toothed segment 93 moves in the central position of the oscillation of the strap 88 faster, compared with the movement of the slide member 42′ than in the end positions, which brings about, in desired fashion, an additional smoothing of the movements of the toothed segments 93 in the end positions.

Aside from this change in the lever arm ratio as a result of such motion, the axis of oscillation can also now be varied step-wise in the case of the gearing of FIG. 7 in order to change the angle of oscillation of the toothed segment 93 and thus the angle of rotation of the pinion 65 and of the square rod 71 between the end positions of the reciprocating motion. For this purpose, the bar guide 100, 101 is displaced with the bracket 99 with respect to the machine frame by means of the power cylinder and the adjusting device for the stepped drum.

This adjustment takes place as follows. First of all the valve 112 is shifted to vent the rear working chamber in the cylinder 108. The motor 124 is then energized by means of the switch 125 until the driver pin 122 has effected one revolution around the shaft 120 and thereby steps the Maltese cross 119 and the stepped drum further forward by one division of the Maltese cross. The motor 124 is for this purpose so constructed and/or connected to its source of voltage that its direction of rotation corresponds to the rotation of the stepped drum so that with this rotation a lower stop member comes in front of the stop pin 113. The rear working chamber in the cylinder 108 is now again connected, by operation the valve 112, to the source of pressure medium, and the pressure exerted on the piston 109 shifts the entire rod guide with the bearing bracket 99 until the pin 113 strikes against the new stop member and thereupon holds the bar guide and the bearing bracket firm in this new position.

This process is repeated upon each further reversal of the angle of oscillation of the toothed segment 93 and of the pinion 65 and the square bar 71 in the same sequence, starting from the highest stop member and the angle of oscillation of the said part being increased with each reversal. Finally the two valves 111 and 112 are reversed so that the front working chamber in the cylinder 108 is placed under pressure and the rear working chamber is vented, and the bar guide is returned to the starting position.

It is self-evident that the actuating of the valves 111 and 112 and of the switch 125 can be controlled both in their sequence and also as a function of certain conditions, such as for instance the number of reciprocating motions of the square bar 71, by an automatic mechanism of known design.

I claim:

1. A device for converting uniform rotary motion into intermittent reciprocating motion with a certain time interval of standstill in the end positions, comprising a drive shaft, means mounting the drive shaft to turn about a fixed axis, a planet wheel carrier fixed to the drive shaft, a planet wheel of radius X mounted in said carrier for rotation with respect thereto about an axis parallel to but displaced from said fixed axis by a distance of 3X, means operatively connected with said planet wheel and responsive to rotation of said planet carrier to produce rotation of said planet wheel about its axis in the opposite angular direction from the planet carrier and with a speed of rotation about its axis which is four times the speed of rotation of the said carrier about said fixed axis, a crank connected with the planet wheel for rotation therewith, a slide member, means mounting said slide member for sliding in a direction transverse to said fixed axis, a slide block, means mounting said slide block in said slide member for movement in a straight line perpendicular to said fixed axis and to the direction of movement of the slide member, said crank having at a distance of 1/3X from the center of said planet wheel a crank pin operatively engaging said slide block, and means operatively connected with the slide member for deriving reciprocating movement therefrom, said means for producing rotation of the planet wheel comprising a second shaft carried by said planet carrier and displaced from but parallel to said fixed axis, a wheel carried by said second shaft and drivingly engaging said planet wheel, a fixed gear coaxial with said fixed axis and a second wheel carried by said second shaft outside the planet carrier having driving engagement with said fixed wheel.

2. In a device as claimed in claim 1, the means for deriving the reciprocating motion including a lever, means mounting the lever to turn about an axis, said lever mounting means being slidable longitudinally of the lever to adjust the pivot point thereof, means operatively connecting a point of said lever to said slide member, and a reciprocable member connected to another point of the lever.

3. In a device as claimed in claim 2, a gear segment, means operatively connecting the gear segment to said reciprocal member to be oscillated thereby and a gear engaging said gear segment.

4. In a device as claimed in claim 3, means mounting said mounting means for said lever for sliding movement longitudinally of the lever to adjust the pivot point thereof.

5. In a device as claimed in claim 4, said mounting means for the lever being displacable at right angles to the direction of movement of the slide member.

6. A device as claimed in claim 4, said mounting means for said lever including a block slidably engaging the lever and means mounting the block to pivot about an axis, and means mounting said block for movement in a direction transverse to the direction of movement of said slide member.

7. In a device as claimed in claim 6, means to produce stepped longitudinal displacement of the block.

8. In a device as claimed in claim 6, said means mounting the block for movement comprising a U-shaped bearing carrier, and means mounting the carrier for sliding movement in a direction perpendicular to the plane of the legs of the bearing carrier, and fluid pressure cylinder means connected with the carrier for producing movement thereof.

9. In a device as claimed in claim 8, a variable step device mounted in the path of movement of the U-shaped carrier against which the carrier is pushed by said cylinder.

10. In a device as claimed in claim 9, said step device comprising a drum mounted for rotation about an axis parallel to the movement of the carrier, said step device having section-like projections on the side facing toward said U-shaped carrier.

11. In a device as claimed in claim 10, Maltese cross drive means for turning said drum.

12. A device for converting uniform rotary motion into intermittent reciprocating motion, comprising a drive shaft, means mounting the drive shaft to turn about a fixed axis, a planet wheel carrier fixed to the drive shaft, a planet wheel mounted in said carrier for rotation with respect thereto about an axis parallel to but displaced from said fixed axis, means operatively connected with said planet wheel and responsive to rotation of said planet carrier to produce rotation of said planet wheel about its axis in the opposite angular direction from the planet carrier, a crank connected with the planet wheel for rotation therewith, a slide member, means mounting said slide member for sliding in a direction transverse to said fixed axis, a slide block, means mounting said slide block in said slide member for movement in a straight line perpendicular to said fixed axis and to the direction of movement of the slide member, said crank having a crank pin operatively engaging said slide block, and means operatively connected with the slide member for deriving reciprocating movement therefrom, said means for producing rotation of the planet wheel comprising a second shaft carried by said planet carrier and displaced from but parallel to said fixed axis, a wheel carried by said second shaft and drivingly engaging said planet wheel, a fixed gear coaxial with said fixed axis and a second wheel carried by said second shaft outside the planet carrier having driving engagement with said fixed wheel, said movement deriving means comprising a rack carried by said slide member and extending parallel to the direction of the movement thereof, an auxiliary shaft mounted to turn about an axis, a gear on said auxiliary shaft engaging said rack, a second slide member, means mounting said second slide member for movement in a direction perpendicular to the axis of said auxiliary shaft, a second slide block, means mounting said second slide block in said second slide member for linear movement in a direction transverse to the axis of said auxiliary shaft and perpendicular to the direction of movement of the second slide member, and a second crank mounted on said auxiliary shaft having a second crank pin engaging in said second slide block.

13. In a device as claimed in claim 12, means to adjust the radius of rotation of said second crank pin.

References Cited

UNITED STATES PATENTS 2,676,799   4/1954   Fletcher _____ 74—52 X

FOREIGN PATENTS 787,595   7/1935   France.

MILTON KAUFMAN, *Primary Examiner.*